United States Patent
Kirchhofer et al.

(10) Patent No.: US 10,298,515 B1
(45) Date of Patent: May 21, 2019

(54) METHODS, SYSTEMS, AND COMPUTER READABLE MEDIUMS FOR CREATING A TENANT CLOUD

(71) Applicant: VCE Company, LLC, Richardson, TX (US)

(72) Inventors: Richard Kirchhofer, Raleigh, NC (US); Peng Liu, Milpitas, CA (US); Michael Tan, Palo Alto, CA (US); Gilbert Lau, Cupertino, CA (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 389 days.

(21) Appl. No.: 14/731,820

(22) Filed: Jun. 5, 2015

(51) Int. Cl.
*H04L 12/24* (2006.01)
*H04L 12/911* (2013.01)

(52) U.S. Cl.
CPC ............ *H04L 47/783* (2013.01); *H04L 41/22* (2013.01)

(58) Field of Classification Search
CPC .............................. H04L 47/783; H04L 41/22
See application file for complete search history.

(56) References Cited

U.S. PATENT DOCUMENTS

| | | | | |
|---|---|---|---|---|
| 8,813,174 B1* | 8/2014 | Koeten | ................. | H04L 41/022 709/223 |
| 9,059,928 B2* | 6/2015 | Beheshti-Zavareh | ........................ | H04L 45/64 |
| 2003/0028670 A1* | 2/2003 | Lee | ........................ | H04L 45/02 709/241 |
| 2009/0185508 A1* | 7/2009 | Duke | ...................... | H04L 45/02 370/255 |
| 2011/0085445 A1* | 4/2011 | Klincewicz | ........... | H04L 41/145 370/238 |
| 2013/0198755 A1* | 8/2013 | Kim | ........................ | G06F 9/505 718/104 |
| 2014/0297874 A1* | 10/2014 | Matsubara | ........ | G06F 17/30386 709/226 |
| 2016/0134558 A1* | 5/2016 | Steinder | ................ | H04L 47/783 709/226 |
| 2016/0142338 A1* | 5/2016 | Steinder | .............. | H04L 41/0813 709/226 |
| 2016/0149766 A1* | 5/2016 | Borowiec | ............. | G06F 3/0481 715/735 |
| 2016/0191325 A1* | 6/2016 | Pacella | ................... | H04L 41/12 370/254 |
| 2016/0239595 A1* | 8/2016 | Maes | .................... | G06F 9/5061 |
| 2016/0285694 A1* | 9/2016 | Maes | .................... | G06F 9/5072 |
| 2017/0063614 A1* | 3/2017 | Hartwig | .............. | H04L 41/0806 |

* cited by examiner

*Primary Examiner* — Michael A Keller
*Assistant Examiner* — Jsing Forng Lin
(74) *Attorney, Agent, or Firm* — Jenkins, Wilson, Taylor & Hunt P.A.

(57) ABSTRACT

Methods, systems, and computer readable mediums for creating a tenant cloud are disclosed. According to one exemplary embodiment, a method for creating a tenant cloud includes receiving a request for creating a tenant cloud, wherein the request includes a tenant cloud policy indicating at least one application for utilizing a tenant cloud, wherein the tenant cloud includes a set of resources configured to act as a single tenant computing environment. The method also includes determining, using the tenant cloud policy, a set of resources for the tenant cloud. The method further includes configuring the set of resources to act as the single tenant computing environment. The method also includes deploying the at least one application for utilizing the tenant cloud.

18 Claims, 4 Drawing Sheets

METHODS, SYSTEMS, AND COMPUTER READABLE MEDIUMS FOR CREATING A TENANT CLOUD

TECHNICAL FIELD

The subject matter described herein relates to computing environment management. More specifically, the subject matter relates to methods, systems, and computer readable mediums for creating a tenant cloud.

BACKGROUND

A cloud computing environment (also referred to herein as a cloud) may generally include a set of resources allocated and/or configured for a class of users to create and manage. For example, administrative control and management of cloud related resources (e.g., components, devices, virtual machines, etc.) in a network system are generally assigned to system administrators operating in accordance with designated "roles" and/or tasks. After the system administrators configure a cloud computing environment, another class of users may utilize the cloud computing environment. However, the aforementioned process is largely inefficient and can significantly impact the operation of a business entity having dynamic or changing needs (e.g., workloads that require varying resource configurations) for a cloud computing environment.

SUMMARY

Methods, systems, and computer readable mediums for creating a tenant cloud are disclosed. According to one exemplary embodiment, a method for creating a tenant cloud includes receiving a request for creating a tenant cloud, wherein the request includes a tenant cloud policy indicating at least one application for utilizing a tenant cloud, wherein the tenant cloud includes a set of resources configured to act as a single tenant computing environment. The method also includes determining, using the tenant cloud policy, a set of resources for the tenant cloud. The method further includes configuring the set of resources to act as the single tenant computing environment. The method also includes deploying the at least one application for utilizing the tenant cloud.

BRIEF DESCRIPTION OF THE DRAWINGS

The subject matter described herein will now be explained with reference to the accompanying drawings of which.

DETAILED DESCRIPTION

Figure 1:
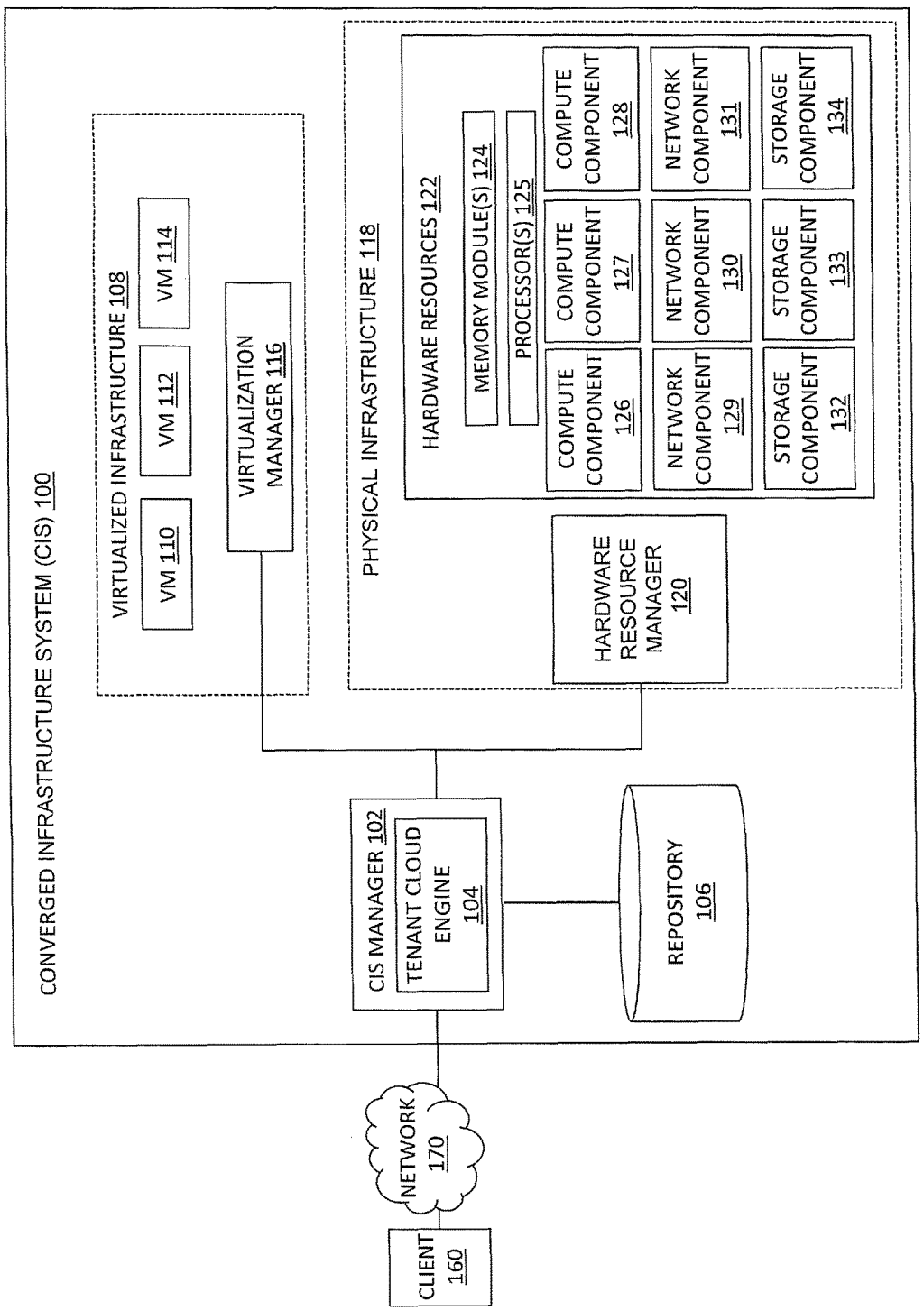
FIG. 1 is a diagram illustrating a converged infrastructure system according to an embodiment of the subject matter described herein.

The subject matter described herein includes methods, systems, and computer readable mediums for creating a tenant cloud. In accordance with some aspects of the disclosed subject matter, functionality for creating a tenant cloud can involve interacting with one or more converged infrastructure system (CISs), such as an integrated infrastructure system (e.g., a Vblock® System from VCE Company, LLC), and/or computing system components (CSCs) therein. For example, a CIS can comprise multiple CSCs, such as physical resources and/or virtual resources, in a preconfigured or prepackaged computing platform, where some CSCs are developed and/or manufactured by multiple entities. For example, an exemplary CIS can comprise data storage devices, servers, networking equipment, and software for managing physical resources and/or virtualized resources (e.g., virtual servers). Although portions of the following disclosure describe the use of one or more CISs, any integrated infrastructure system or device can be utilized without departing from the scope of the present subject matter.

In accordance with some aspects of the disclosed subject matter, a computing platform (e.g., a node or device) or module (e.g., firmware, hardware, and/or software executing on a processor) can include functionality for creating or updating a tenant cloud. For example, a tenant cloud may include a set of resources (e.g., physical compute, network, and storage resources) configured to act as a single tenant (e.g., a company or enterprise) computing environment. In this example, the tenant cloud may be created and configured automatically using an algorithm that attempts to select an appropriate set of resources based on a tenant cloud policy.

In accordance with some aspects of the disclosed subject matter, a tenant cloud policy can include information for selecting and configuring a set of resources for a tenant cloud. For example, a tenant cloud policy may include policy priorities, resource requirements, and/or usage information. In this example, a policy priority may include information for indicating that one or more type of resources should have priority e.g., storage resources over compute resources or vice versa), e.g., during a resource selection phase of a tenant cloud creation process. In another example, usage information may include information for indicating one or more applications to install and/or configure for use in the tenant cloud, e.g., during a resource configuration or initialization phase of a tenant cloud creation process.

In accordance with some aspects of the disclosed subject matter, a computing platform (e.g., a node or device) or module (e.g., firmware, hardware, and/or software executing on a processor) can include functionality for dynamically and/or periodically modifying a tenant cloud or resources thereof. For example, a tenant cloud creation module or platform may provide an automatic elasticity function which can add, remove, and/or rebalance (e.g., reconfigure and/or move between clusters) resources as needed based on one or more goals, requirements, priorities, or other information associated with a tenant cloud policy. By dynamically or periodically modifying a tenant cloud or resources thereof, a tenant cloud creation module or platform can provide an on-demand, self-managed cloud, where applications are already deployed in an environment defined by a user using resources determined to be the best suited for satisfying the user's needs or goals.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary CIS 100 according to an embodiment of the subject matter described herein. Although the following disclosure describes the use of CIS 100, any type of computer system can be utilized without departing from the scope of the present subject matter. CIS 100 can comprise CSCs, such as virtual resources and physical resources. For example, physical resources can comprise a processor, a memory module, a compute component, a network component, a storage component, a server, network equipment, a router, a switch, wiring or cabling, a storage device, a physical port, and/or a communications interface. For example, virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 can also comprise software and related components for managing the CIS and/or portions (e.g., CSCs) therein.

In some embodiments, CIS 100 can be configured to provide data management functionality, cloud service functionality, and/or other functionality. CIS 100 can be capable of communicating with other CISs (e.g., located at various physical locations or sites) and can communicate with various other entities, such as network nodes (e.g., servers hosting online sites) and users. For example, client 160 can represent any entity (e.g., software executing on a processor, a web-based interface, etc.) for allowing a user (e.g., a human operator or an automated system) to interact with CIS 100, CSCs therein, and/or other entities. In some embodiments, client 160 can communicate directly with CIS 100 with or without using network 170.

In some embodiments, CIS 100 can comprise a CIS manager 102, a repository 106, virtualized infrastructure 108, and/or physical infrastructure 118. CIS manager 102 can be any suitable entity for managing aspects of CIS 100 or portions therein (e.g., CSCs or groups of CSCs). CIS manager 102 can be configured to communicate with various CSCs and/or for managing various CSCs. For example, CIS manager 102 can be configured to access each CSC within CIS 100 and return relevant information to client 160. For example, CIS manager 102 can be configured to manage performance, resource utilization levels, and other aspects associated with virtualized infrastructure 108 and/or physical infrastructure 118. In some embodiments, CIS manager 102 can comprise VCE Vision™ Intelligent Operations software and/or firmware.

In some embodiments, CIS manager 102 can include a converged infrastructure management application for interacting with CIS 100 and/or CSCs therein. In such embodiments, the converged infrastructure management application can include or provide a graphical user interface (GUI), a command-line interface (CLI), an application programming interface (API), and/or or other communications interface. For example, a converged infrastructure management application can provide a web-based GUI containing a query page for requesting information about a CIS 100 and/or CSCs therein.

CIS manager 102 can comprise or interact with a tenant cloud engine 104. Tenant cloud engine 104 can be any suitable entity (e.g., hardware, firmware, and/or software executing on a processor) for performing one or more aspects associated with optimizing data processing. For example, tenant cloud engine 104 can be configured to receive a request for creating a tenant cloud, to determine, using a tenant cloud policy, a set of resources for the tenant cloud, to configure the set of resources to act as a single tenant computing environment, and/or to deploy at least one application for utilizing the tenant cloud.

In some embodiments, a tenant cloud may include a partition (e.g., a logical grouping) of various resources and may act as a single tenant computing environment. For example, a tenant cloud may be configured such that only a tenant cloud owner (e.g., a user or system considered to be a tenant cloud administrator) can administer and/or configure resources associated with the tenant cloud. In another example, a tenant cloud may be configured such that workloads associated with a single business or entity can use the tenant cloud and related resources, whereas workloads associated with other entities cannot utilize the tenant cloud.

In some embodiments, a tenant cloud may include a set of compute resources, storage resources, and/or network resources, such as one or more of compute components 126-128, network components 129-131, and/or storage components 132-134. For example, tenant cloud engine 104 or a related entity (e.g., software or executable instructions) may determine a best suited (e.g., most appropriate) set of resources (e.g., a partition) from available resources at the time of a creation request. In this example, the determination may be made using user provided requirements, system related requirements, and/or other information (e.g., metrics indicating ability of resources to communicate with other resources and/or other entities).

In some embodiments, a tenant cloud policy may be used in creating a tenant cloud. For example, a tenant cloud policy may include policy priorities, resource requirements (e.g., sizing requirements, speed requirements, quality requirements, storage requirements, etc.), and/or usage information. For example, policy priorities may include information for indicating that some resources are prioritized over other resources when creating a tenant cloud. In this example, a tenant cloud policy may indicate that compute resources are priority, storage resources are priority, and/or network resources are priority. In some embodiments, policy requirements may be ranked, if desired, but not equally.

In some embodiments, a tenant cloud policy may include resource requirements for a tenant cloud. For example, a tenant cloud policy may include size, speed, and/or quality requirements for a compute resource, a storage resource, and/or a network resource. In this example, a storage resource requirement may indicate an amount of storage space in gigabytes (GBs), storage media or type (e.g., flash, random access memory (RAM), tape, or physical disk), bandwidth, and/or speed of the storage resource. In another example, a network resource requirement may indicate acceptable transmission mediums, acceptable protocols for communications, and/or other requirements (e.g., a storage area network (SAN) device, a stand alone switch, number of ports available, throughput, etc.). In yet another example, a compute resource requirement may indicate a core amount (e.g., 1 core, 2 core, 4 core, etc.), processor(s) speed, processor bus width, processor architecture, processor cache type, processor model or series information, and/or other requirements.

In some embodiments, resources for a tenant cloud may be selected using topology and/or connectivity information. For example, tenant cloud engine 104 or a related entity (e.g., an algorithm executing on a processor) may determine and/or classify a connection topology (e.g., a physical topology and/or logical topology of connections between resources) associated with available resources prior to selecting a set of resources for a tenant cloud. In this example, the resources used may not all be equally connected (e.g., to other resources) or have equal attributes.

However, in some embodiments, tenant cloud engine 104 or a related entity may attempt to select appropriate resources that are connected together using a mesh topology, if available, and, if not available, may attempt to select appropriate resources that are connected together using other topologies.

In some embodiments, metrics for analyzing and/or selecting resources for a tenant cloud may be determined and/or generated. For example, tenant cloud engine 104 or a related entity may determine which storage resource(s) (e.g., of storage components 132-134) can be shared with which compute resource(s) (e.g., of compute components 126-128) via which network resource(s) (e.g., of network components 129-131). In this example, one or more data structures (e.g., a COMPUTESET or a STORAGESET) may be maintained for indicating which resources are accessible by a given storage resource. Continuing with this example, a metric or weight (e.g., an accessibility weight) may be generated for each storage resource based on various attributes, such as the size and quality (e.g. tier) of the available storage and the bandwidth between resources, and/or other attributes. In another example, tenant cloud engine 104 or a related entity may determine which compute resource(s) (e.g., of compute components 126-128) can be shared with which storage resource(s) (e.g., of storage components 132-134) via which network resource(s) (e.g., of network components 129-131). In this example, one or more data structures (e.g., a COMPUTESET or a STORAGESET) may be maintained for indicating which resources are accessible by a given compute resource. Continuing with this example, a metric or weight (e.g., an accessibility weight) may be generated for each compute resource based on various attributes, such as the processing speed of the compute resource and/or other attributes.

In some embodiments, various metrics, connectivity information, and/or other information may be used in determining one or more potential sets of resources for a tenant cloud. For example, tenant cloud engine 104 or a related entity may use a tenant cloud policy, connectivity information, computed scores or weights associated with various resources, and/or other tenant cloud related information for determining or selecting compute resources, storage resources, and/or network resources for a tenant cloud that satisfies the tenant cloud policy.

In some embodiments, tenant cloud engine 104 or a related entity may include functionality for updating a tenant cloud. For example, tenant cloud engine 104 may determine, select, and/or configure additional resources and/or applications of an existing tenant cloud. In this example, tenant cloud engine 104 may receive a tenant cloud policy that indicates various resource requirements and application requirements for the existing tenant cloud and may select additional resources and applications that satisfies the tenant cloud policy.

In some embodiments, tenant cloud engine 104 or a related entity may include functionality for dynamically and/or periodically modifying a tenant cloud or resources thereof. For example, tenant cloud engine 104 may provide an automatic elasticity function which may add, remove, and/or rebalance (e.g., reconfigure and/or move between clusters) resources as needed based on one or more goals, requirements, priorities, or other information associated with a tenant cloud. In this example, a tenant cloud policy may enable the automatic elasticity function and may also indicate goals, requirements, priorities, and/or other information for determining when and if to modify a tenant cloud. Continuing with this example, tenant cloud engine 104 may select and configure resources and/or applications as needed, e.g., by installing or removing applications, adding more resources, removing resources, or rebalancing resources.

In some embodiments, by dynamically or periodically modifying a tenant cloud or resources thereof, tenant cloud engine 104 or a related entity can provide an on-demand, self-managed cloud, where applications are already deployed (e.g., executing) in an environment defined by a user (e.g., a tenant cloud owner via a tenant cloud policy) using resources determined to be the best suited for satisfying the user's needs or goals (e.g., as indicated by or derived from a tenant cloud policy).

In some embodiments, tenant cloud related information can be stored in repository 106. Repository 106 can include any data storage unit (e.g., a database or plurality of databases) that can be configured to tenant cloud related information, such as tenant cloud policy, resource data (e.g., size, speed, status, etc.), connectivity data, and/or other information. Although FIG. 1 depicts repository 106 as a local data storage unit residing on CIS 100, repository 106 can also be embodied as a data storage unit located at an online location (e.g., a public distributed content site), on a local proxy server in a customer's or system administrator's environment, or on a different CIS without departing from the scope of the disclosed subject matter. Further, repository 106 can be implemented using one or more computing platforms, devices, or systems.

In some embodiments, repository 106 can be provisioned with tenant cloud related information from a second repository (e.g., from a second CIS or from an online location, such as a known, online site that can be hosted by the CIS manufacturer). For example, tenant cloud related information can be obtained or copied from a second repository (e.g., a second CIS, an online site, online repository, or any other online location) over network 170, using secure copy (SCP) protocol, file transfer protocol (FTP), secure file transfer protocol (SFTP), hypertext transfer protocol (HTTP), or any like protocol. In some embodiments, CIS 100 and a second CIS can be located at a common site and can be communicatively connected by a wired connection. In such a configuration, repository 106 can be provisioned with tenant cloud related information from the second CIS via the wired connection. It is understood that the provisioning of repository 106 with tenant cloud related information using the exemplary methods described above can be conducted via any automated or automatic manner. In addition, tenant cloud related information copied from a second repository and installed into repository 106 can utilize any form of transportable mediums, such as a compact disc (CD), flash memory, a universal serial bus (USB) device, and the like.

Virtualized infrastructure 108 can comprise a virtualization environment configured to simulate components of a computing device, such as a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and can interact with various nodes, components, and/or users.

In some embodiments, virtualized infrastructure 108 can be associated with one or more virtual entities. Each virtual entity can comprise one or more CIS or portions therein, e.g., CSCs from one or more CISs. In some embodiments, virtualization manager 116 can allow logical entities to be created, deleted, or modified using an API and/or a GUI. Virtualization manager 116 can be any suitable entity (e.g., software executing in a virtual machine) for managing aspects associated with virtualized infrastructure 108. In some embodiments, virtualization manager 116 can be configured for providing data management via one or more communications interfaces. For example, virtualization manager 116 can communicate with one or more third-party management tools using APIs.

Physical infrastructure 118 can comprise physical or hardware resources 122, such as memory module(s) 124, processor(s) 125, compute components 126-128, network components 129-131, and storage components 132-134. Hardware resources 122 can be communicatively connected to various other CSCs in CIS 100 and other entities. Hardware resources 122 can be configured for use by one or more virtual entities. In some embodiments, network components 129-131 (e.g., network switches or storage area network (SAN) switches) can be configured to enable communication between the components in CIS 100. In some embodiments, one or more file share storage (FSS) systems (not shown) can be utilized to provide file system level access to a CIS across a local area network (LAN).

Hardware resource manager 120 can be any suitable entity (e.g., software executing in a virtual machine) for managing aspects associated with physical infrastructure 118. In some embodiments, hardware resource manager 120 can be configured to provision hardware resources 122 via one or more communications interfaces. For example, hardware resource manager 120 can provision hardware resources 122 for implementing one or more virtual entities in virtualized infrastructure 108. In some embodiments, hardware resource manager 120 can comprise any management component or entity, such as a unified infrastructure manager (UIM) or a unified computing system (UCS) director entity, which is configured to provision the physical hardware of CIS 100.

In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of some aspects of the disclosed subject matter. In some embodiments, each of storage components 132-134 can include any storage medium or storage unit that is configured to store information accessible by processor(s) 125 via a system bus. In some embodiments, repository 106 or portions thereof can utilize storage components 132-134 and/or memory module(s) 124. For example, repository 106 may be implemented using storage component 132. In some embodiments, repository 106 and/or storage components 132-134 can include or utilize one or more storage area networks.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, tenant cloud engine 104 or repository 106 (e.g., a system library or data therein) can be located at a single computing system or can be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 can be incorporated or implemented using one or more other entities depicted in FIG. 1. For example, memory module(s) 124 and/or processor(s) 125 can be incorporated in compute component 126, compute component 127, compute component 128, and/or a specialized device or compute component (e.g., an application management pod (AMP)). In another example, CIS manager 102 can be implemented using or located in an AMP and/or another device in physical infrastructure 118. In yet another example, virtualization software and/or virtualized components can be implemented using an AMP and/or another compute device (e.g., a blade appliance designated for some system management software).

It will be appreciated that FIG. 1 is for illustrative purposes and that various components, their locations, and/or their functions as described above in relation to FIG. 1 can be changed, altered, added, or removed. For example, tenant cloud engine 104 can comprise multiple, distributed components. Further, aspects of the disclosed subject matter (e.g., tenant cloud engine 104) can be implemented and/or located on any computing system or components therein.

Figure 2:
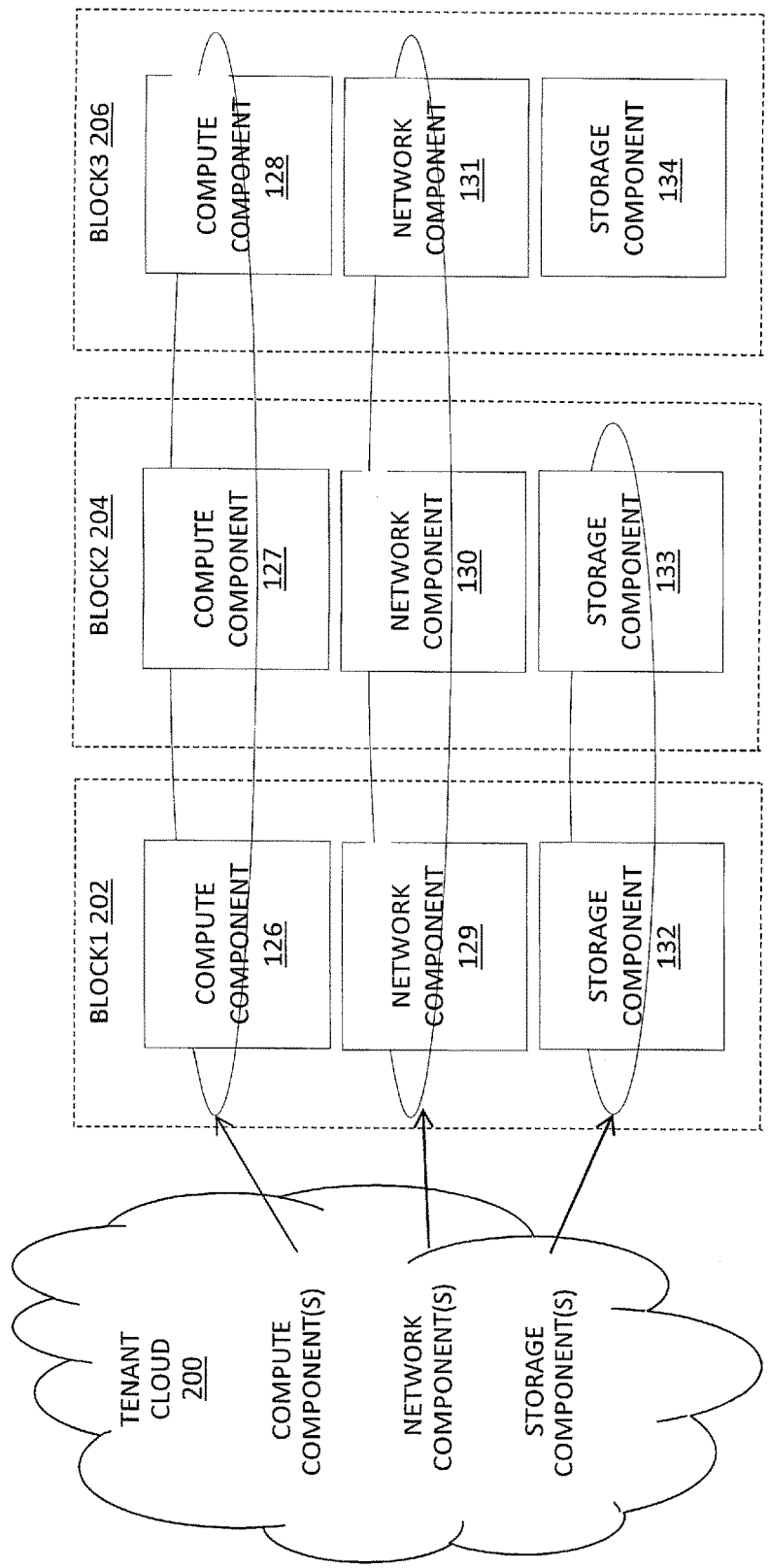
FIG. 2 is a diagram illustrating a tenant cloud including various resources according to an embodiment of the subject matter described herein.

FIG. 2 is a diagram illustrating a tenant cloud 200 including various resources according to an embodiment of the subject matter described herein. Tenant cloud 200 can include one or more resources (e.g., compute components 126-128, network components 129-131, and storage components 132-133) for handling workloads associated with a tenant (e.g., an entity that owns, administers, or controls a tenant cloud).

Referring to FIG. 2, various resources in one or more CISs may be associated with blocks 202-206 (e.g., blades, arrays, racks, and/or systems). For example, each of blocks 202-206 may represent a logical and/or physical grouping of resources. In this example, each block 202-206 may be associated with a particular location, a machine, a device, an integrated circuit, a blade, a server, a rack, a system, a communications bus, and/or some hardware.

In some embodiments, CIS manager 102 or related functionality (e.g., ViPR and/or other software) may be used to abstract resources from blocks 202-206 into pools of storage resources, compute resources, and/or network resources. In such embodiments, tenant cloud engine 104 and/or a related entity may select and configure resources from these resource pools into a unified set of storage, compute, and/or network components for use in tenant cloud 200. For example, compute components 126-128, network components 129-131, and storage components 132-133 may be configured for use in tenant cloud 200, e.g., regardless that some of these components are associated with different blocks 202-206.

In some embodiments, various mechanisms, technologies, and/or techniques may be used for facilitating communications between resources of tenant cloud 200. For example, various protocols, technologies (e.g., virtual extensible local area network (VXLAN)), and/or other techniques (e.g., inter-switch links (ISLs)) may be used for allowing tenant cloud 200 to span resources associated with blocks 202-206.

It will be appreciated that FIG. 2 is for illustrative purposes and that various components, their locations, and/or their functions as described above in relation to FIG. 2 can be changed, altered, added, or removed.

Figure 3:
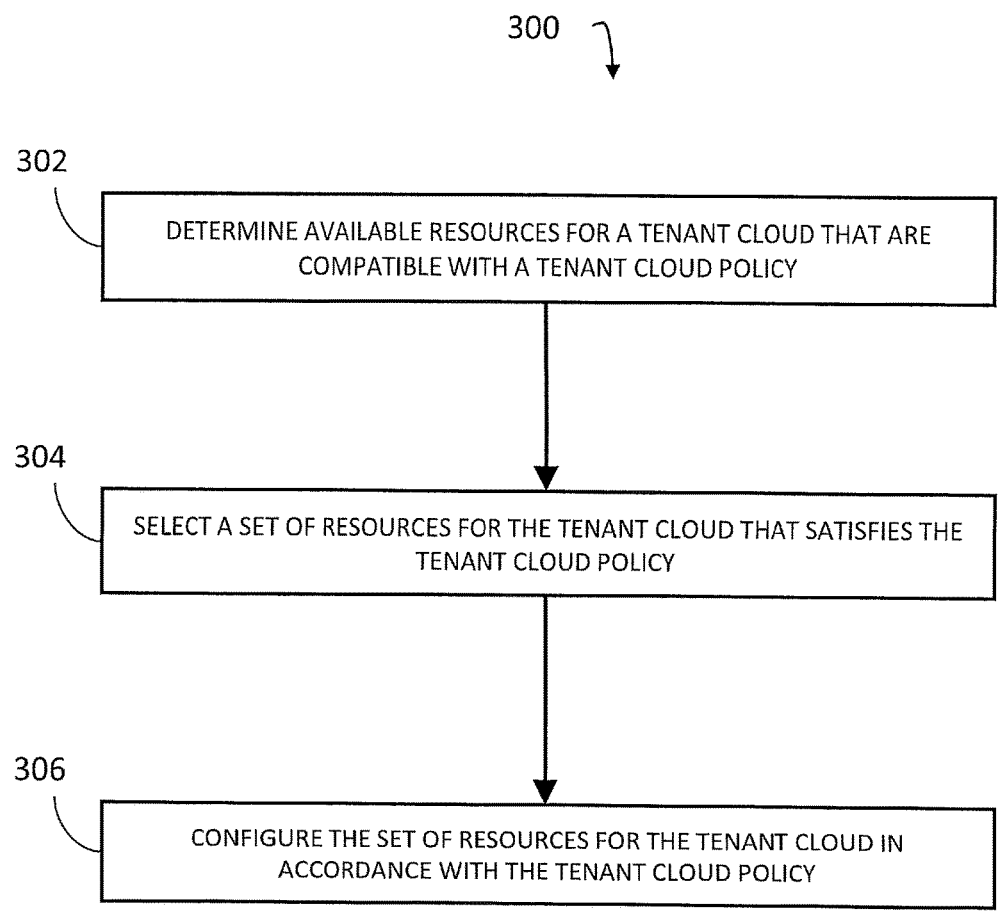
FIG. 3 is a diagram illustrating a method for creating a tenant cloud according to an embodiment of the subject matter described herein.

FIG. 3 is a diagram illustrating a method 300 for creating a tenant cloud according to an embodiment of the subject matter described herein. Referring to method 300, in step 3001, available resources for a tenant cloud that are compatible with a tenant cloud policy are determined. For example, tenant cloud engine 104 may use discovery protocols (e.g., simple network management protocol (SNMP)) and/or management databases for gathering information about resources associated CIS 100 or other computing platforms.

In some embodiments, determining available resources for a tenant cloud may include removing non-operational resources and/or inappropriate resources (e.g., resources that allocated to another tenant or already in use) from consideration as resources for a tenant cloud. In some embodiments, determining available resources may be based, at least in part, on discovered resources meeting or exceeding standards or criteria provided by a tenant cloud policy or other source.

In step 3002, a set of resource for the tenant cloud is selected that satisfies the tenant cloud policy. For example, tenant cloud engine 104 may determine the connection topologies of all available resources and may identify multiple potential sets of resources that may be used for a tenant cloud. In this example, tenant cloud engine 104 may identify mesh combination sets (e.g., if each compute resource has accessibility to all other compute resources and each compute resource has accessibility to all storage resources and resources are located across multiple blocks) and storage location-locked combination sets (e.g., if each compute resource has accessibility to all other compute resources and each compute resource has accessibility to all storage resources and resources are located in a single block).

In some embodiments, after identifying multiple potential sets of resources, each potential set of resources may be analyzed using a tenant cloud policy, policy priorities, a current computing environment, and/or one or more metrics for determining an appropriate set of resources for a tenant cloud. For example, each potential set of resources may be scored or weighted using policy requirements (e.g., a number of compute and/or storage resources needed, resource size, resource performance, resource affinity, etc.). In this example, using the scores or weights computed or determined, tenant cloud engine 104 may select the best set of resources to use for a tenant cloud based on the highest score or weight.

In step 3004, the set of resources for the tenant cloud may be configured in accordance with the tenant cloud policy. For example, tenant cloud engine 104 may automatically provision compute components 126-128, network components 129-131, and storage components 132-134 for use in tenant cloud 200. In this example, provisioning resources may include provisioning hosts (e.g., software and/or ports) on compute components 126-128 for receiving and processing messages and may include creating resource clusters (e.g., resource groups that work together) based on the tenant cloud policy or other requirements.

In some embodiments, configuring and/or provisioning resources may include configuring storage resources to include one or more data stores (e.g., data structures and/or logical storage partitions) based on a tenant cloud policy or other requirements. For example, tenant cloud engine 104 may create data stores using size information and/or amounts indicated in a storage resource requirement or a cluster requirement associated a tenant cloud policy. In some embodiments, each data store may be configured to be accessible to all hosts associated with tenant cloud 200 or one or more resource cluster therein.

In some embodiments, configuring and/or provisioning resources may include configuring network resources based on a tenant cloud policy or other requirements. For example, tenant cloud engine 104 may create and/or configuring virtual networks for facilitating communications between resources of tenant cloud 200. In this example, creating and/or configuring virtual networks may include creating and/or configuring virtual switches for connecting the virtual network and/or may include configuring physical devices, such as routers and switches, for interconnecting physical networks associated with the virtual networks.

In some embodiments, configuring and/or provisioning resources may include setting security policies and/or access policies for resources based on a tenant cloud policy or other requirements. For example, tenant cloud engine 104 may automatically group resources of tenant cloud 200 into a "Tenant Group" so that only a tenant cloud owner (e.g., a user or a related role with an appropriate level of authority) can access or administer the resources.

In some embodiments, configuring and/or provisioning resources may include deploying (e.g., installing, initializing, and/or configuring) one or more applications in a tenant cloud based on a tenant cloud policy or other requirements. For example, tenant cloud engine 104 may automatically deploy applications to tenant cloud 200 that are identified in a tenant cloud policy. In this example, deploying applications may include connecting the applications to compute resources and storage resources of tenant cloud 200 using networking resources of tenant cloud 200 as indicated in the tenant cloud policy.

It will be appreciated that FIG. 3 is for illustrative purposes and that additional and/or different steps than those depicted in FIG. 3 can be usable for creating a tenant cloud. Additionally, it will be appreciated that steps depicted in FIG. 3 can occur in a different order than depicted.

Figure 4:
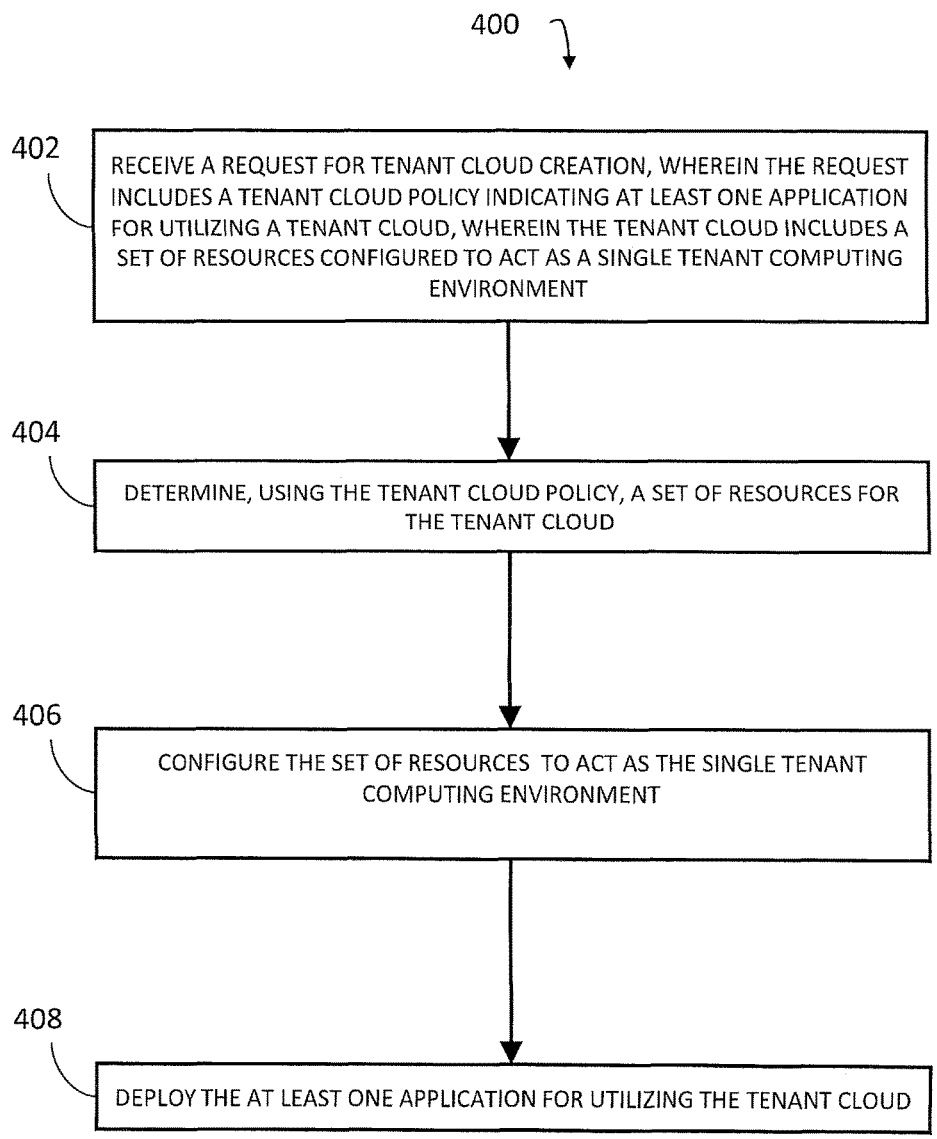
FIG. 4 is a diagram illustrating a method for creating a tenant cloud according to another embodiment of the subject matter described herein.

FIG. 4 is a diagram illustrating a method 400 for creating a tenant cloud according to another embodiment of the subject matter described herein. In some embodiments, method 400 and/or steps therein can be performed by CIS 100, tenant cloud engine 104, and/or another module or node (e.g., a server or computing platform containing one or more processors and memory). For illustrative purposes and explanation, references to entities included in FIGS. 1-3 may be used below.

In step 402, a request for creating a tenant cloud is received. The request includes a tenant cloud policy indicating at least one application for utilizing a tenant cloud. For example, tenant cloud 200 may include a set of resources configured to act as a single tenant computing environment.

In some embodiments, a request for creating a tenant cloud can be received via at least one member selected from a group consisting of a converged infrastructure system, a user interface, a GUI, a CLI, and/or an API. For example, client 160 may send a request for creating a tenant cloud via an API or GUI associated with CIS 100 and the request may be processed and performed by a second CIS connected via network 170.

In step 404, a set of resources for the tenant cloud is determined using the tenant cloud policy. For example, a tenant cloud policy may indicate that a certain amount of processing power and/or storage is needed. In this example, the tenant cloud policy may also indicate that a certain amount of connectivity is needed among resources of the tenant cloud.

In some embodiments, a tenant cloud policy can indicate that at least one type of resource has priority over other factors or criteria used when determining the set of resources for the tenant cloud. For example, a tenant cloud policy may indicate that at least 75 gigahertz (GHz) of total compute cycles and at least 10 terabytes (TB) of storage are needed for a tenant cloud. In this example, the tenant cloud policy may also indicate that storage resources are priority over storage. Continuing with this example, tenant cloud engine 104 may use the tenant cloud policy and may select a set of resources with a preference for "better" compute resources over similarly situated storage resources.

In some embodiments, determining, using a tenant cloud policy, a set of resources for a tenant cloud can include determining connectivity between the set of resources. For example, tenant cloud engine 104 may identify physical connection topologies for various resources of CIS 100. In this example, tenant cloud engine 104 may attempt to select a set of resources that are connected to each other via a mesh physical connection topology or that can communicate via one or more connections.

In some embodiments, determining, using a tenant cloud policy, a set of resources for a tenant cloud can include identifying available resources from a group of resources that satisfies the tenant cloud policy. For example, tenant cloud engine 104 may identify a subset of available resources from a group of resources associated with CIS 100. In this example, the group of resources may include incompatible, unavailable, or other otherwise unusable (e.g., administratively blocked) resources in addition to resources that satisfies a particular tenant cloud policy.

In some embodiments, a set of resources can include at least two members selected from a group consisting of a compute component, a network component, and/or a storage component. For example, tenant cloud 200 may include compute components 126-128, network components 129-131, and storage components 132-133.

In step 406, the set of resources is configured to act as the single tenant computing environment. For example, assuming the tenant cloud is created for a web service provider that processes messages for tiers of the web service provider's customers, the tenant cloud and/or its resources may be configured to handle the workloads associated with the web service provider and its customers, but may not process messages or handle workload associated with another entity (e.g., a different web service provider), In step 408, the at least one application for utilizing the tenant cloud is deployed. For example, a database application and/or other programs may be deployed for processing requests associated with a web service.

In some embodiments, configuring a set of resources can include configuring the set of resources such that only an owner of a tenant cloud can subsequently administer the set of resources.

It should be noted that tenant cloud engine 104 and/or functionality described herein can constitute a special purpose computing system. Further, tenant cloud engine 104 and/or functionality described herein can improve the technological field of cloud management systems by optimizing and/or automating tenant cloud creation. For example, tenant cloud engine 104 may select and configure a set of resources for a tenant cloud that connect via a mesh topology or other physical connection topology. In this example, tenant cloud engine 104 may also deploy a user-specified application or service that utilizes the tenant cloud or resources thereof.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for creating a tenant cloud, the method comprising:

receiving a request for creating a tenant cloud, wherein the request includes a tenant cloud policy indicating at least one application for utilizing a tenant cloud, wherein the tenant cloud includes a set of resources configured to act as a single tenant computing environment;

determining, using the tenant cloud policy, a set of resources for the tenant cloud, wherein determining, using the tenant cloud policy, the set of resources for the tenant cloud includes determining multiple potential sets of resources for the tenant cloud, wherein each of the multiple potential sets of resources is based on at least in part a type of connection topology connecting compute and storage resources in the respective potential set of resources, wherein at least one of the multiple sets of resources are connected using a mesh connection topology, wherein each of the multiple potential sets of resources is weighted or scored based on requirements of the tenant cloud policy, wherein the set of resources is selected from among the multiple potential sets of resources based on the highest weight or score;

configuring the set of resources to act as the single tenant computing environment; and deploying the at least one application for utilizing the tenant cloud.

2. The method of claim 1 wherein the request is received via at least one member selected from a group consisting of a converged infrastructure system, a user interface, a graphical user interface (GUI), a command-line interface (CLI), and an application programming interface (API).

3. The method of claim 1 wherein the tenant cloud policy indicates that at least one type of resource has priority over other factors when determining the set of resources for the tenant cloud.

4. The method of claim 1 wherein configuring the set of resources includes configuring the set of resources such that only an owner of the tenant cloud can subsequently administer the set of resources.

5. The method of claim 1 wherein determining, using the tenant cloud policy, the set of resources for the tenant cloud includes identifying available resources from a group of resources that satisfies the tenant cloud policy.

6. The method of claim 1 wherein the set of resources includes at least two members selected from a group consisting of a compute component, a network component, or a storage component.

7. A system for creating a tenant cloud, the system comprising:
- a processor; and
- a tenant cloud engine implemented using the processor, wherein the tenant cloud engine is configured to receiving a request for creating a tenant cloud, wherein the request includes a tenant cloud policy indicating at least one application for utilizing a tenant cloud, wherein the tenant cloud includes a set of resources configured to act as a single tenant computing environment, to determine, using the tenant cloud policy, a set of resources for the tenant cloud, wherein the tenant cloud engine is configured to determine multiple potential sets of resources for the tenant cloud, wherein each of the multiple potential sets of resources is based on at least in part a type of connection topology connecting compute and storage resources in the respective potential set of resources, wherein at least one of the multiple sets of resources are connected using a mesh connection topology, wherein each of the multiple potential sets of resources is weighted or scored based on requirements of the tenant cloud policy, wherein the set of resources is selected from among the multiple potential sets of resources based on the highest weight or score, to configure the set of resources to act as the single tenant computing environment, and to deploy the at least one application for utilizing the tenant cloud.

8. The system of claim 7 wherein the request is received via at least one member selected from a group consisting of a second converged infrastructure system, a user interface, a graphical user interface (GUI), a command-line interface (CLI), and an application programming interface (API).

9. The system of claim 7 wherein the tenant cloud policy indicates that at least one type of resource has priority over other factors when determining the set of resources for the tenant cloud.

10. The system of claim 7 wherein the tenant cloud engine is configured to configure the set of resources such that only an owner of the tenant cloud can subsequently administer the set of resources.

11. The system of claim 7 wherein the tenant cloud engine is configured to identify available resources from a group of resources that satisfies the tenant cloud policy.

12. The system of claim 7 wherein the set of resources includes at least two members selected from a group consisting of a compute component, a network component, or a storage component.

13. A non-transitory computer readable medium having stored thereon executable instructions which, when executed by a processor of a computer, cause the computer to perform steps comprising:

- receiving a request for creating a tenant cloud, wherein the request includes a tenant cloud policy indicating at least one application for utilizing a tenant cloud, wherein the tenant cloud includes a set of resources configured to act as a single tenant computing environment;
- determining, using the tenant cloud policy, a set of resources for the tenant cloud, wherein determining, using the tenant cloud policy, the set of resources for the tenant cloud includes determining multiple potential sets of resources for the tenant cloud, wherein each of the multiple potential sets of resources is based on at least in part a type of connection topology connecting compute and storage resources in the respective potential set of resources, wherein at least one of the multiple sets of resources are connected using a mesh connection topology, wherein each of the multiple potential sets of resources is weighted or scored based on requirements of the tenant cloud policy, wherein the set of resources is selected from among the multiple potential sets of resources based on the highest weight or score;
- configuring the set of resources to act as the single tenant computing environment; and
- deploying the at least one application for utilizing the tenant cloud.

14. The non-transitory computer readable medium of claim 13 wherein the request is received via at least one member selected from a group consisting of a converged infrastructure system, a user interface, a graphical user interface (GUI), a command-line interface (CLI), and an application programming interface (API).

15. The non-transitory computer readable medium of claim 13 wherein the tenant cloud policy indicates that at least one type of resource has priority over other factors when determining the set of resources for the tenant cloud.

16. The non-transitory computer readable medium of claim 13 wherein configuring the set of resources includes configuring the set of resources such that only an owner of the tenant cloud can subsequently administer the set of resources.

17. The non-transitory computer readable medium of claim 13 wherein determining, using the tenant cloud policy, the set of resources for the tenant cloud includes identifying available resources from a group of resources that satisfies the tenant cloud policy.

18. The non-transitory computer readable medium of claim 13 wherein the set of resources includes at least two members selected from a group consisting of a compute component, a network component, or a storage component.

* * * * *